March 26, 1957 D. CHAPMAN 2,786,710
HOUSE TRAILER PORCH ASSEMBLY
Filed Aug. 24, 1953 3 Sheets-Sheet 1
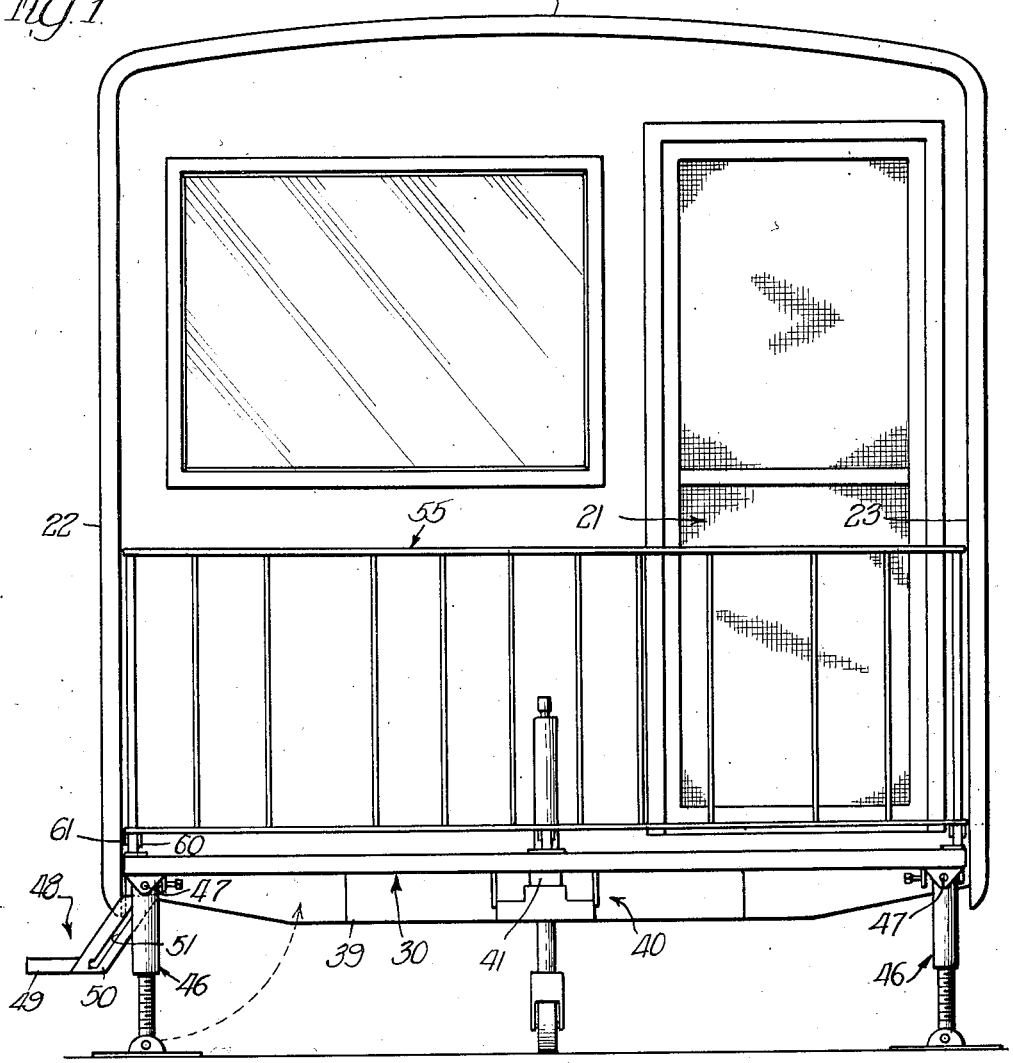
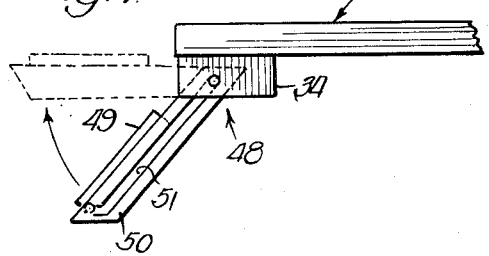
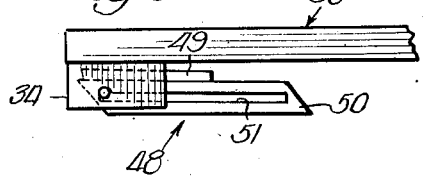
INVENTOR.
Dave Chapman,
BY
ATTYS.

March 26, 1957     D. CHAPMAN     2,786,710
HOUSE TRAILER PORCH ASSEMBLY
Filed Aug. 24, 1953     3 Sheets-Sheet 2
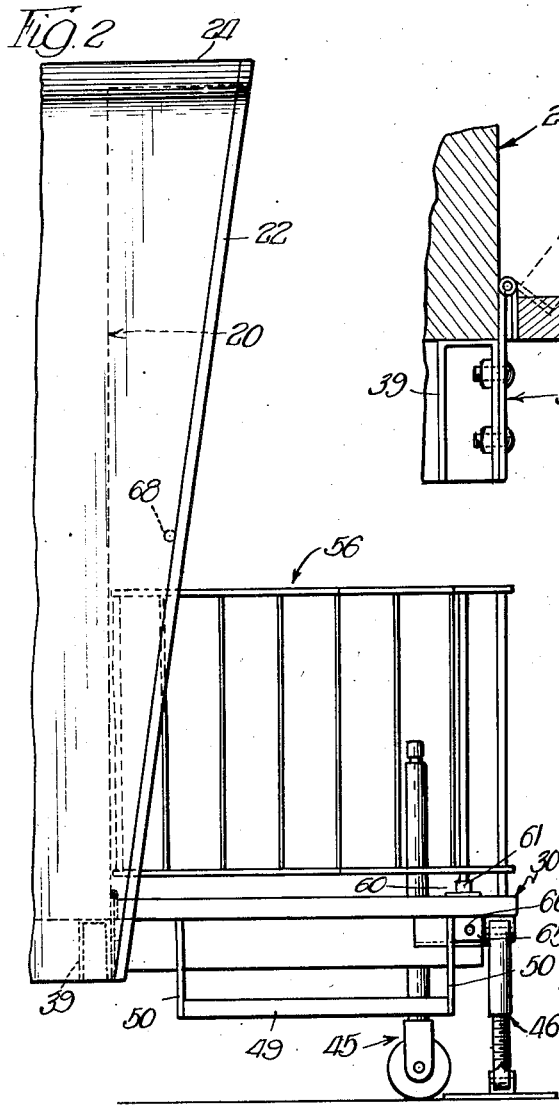
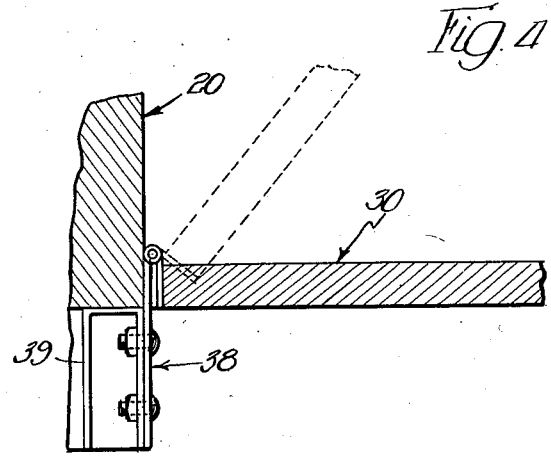
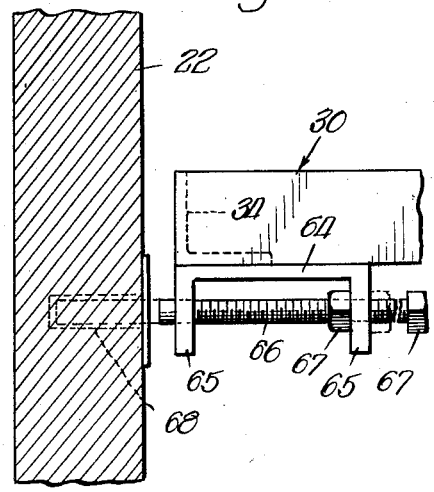
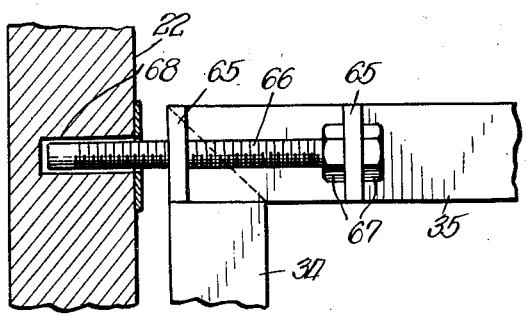
INVENTOR.
Dave Chapman,
BY March 26, 1957 D. CHAPMAN 2,786,710
HOUSE TRAILER PORCH ASSEMBLY
Filed Aug. 24, 1953 3 Sheets-Sheet 3
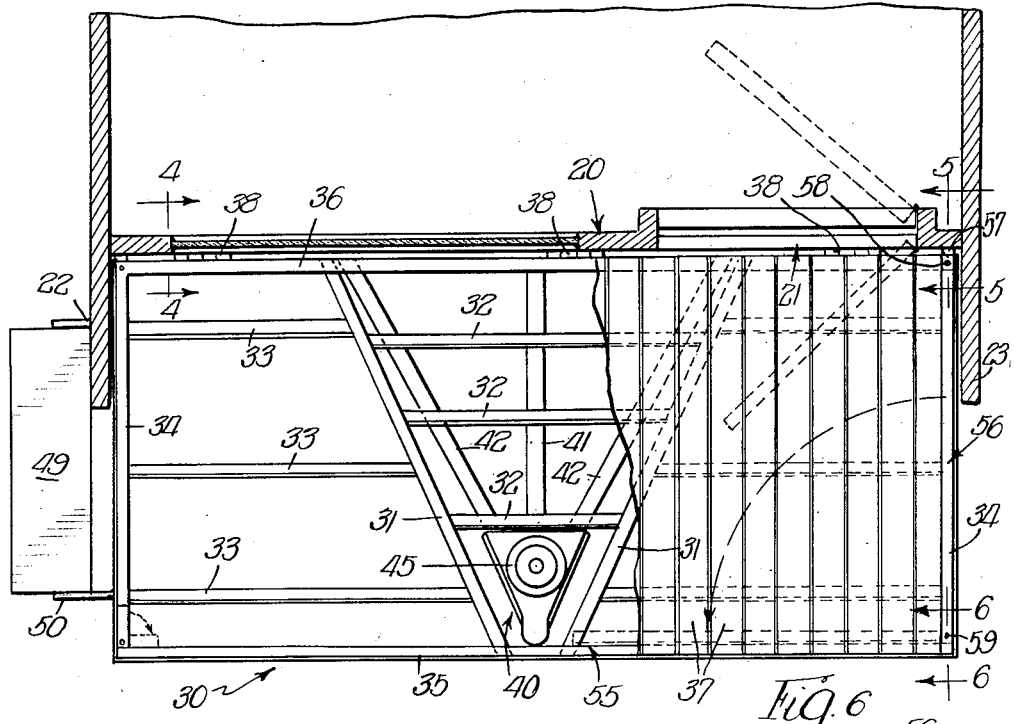
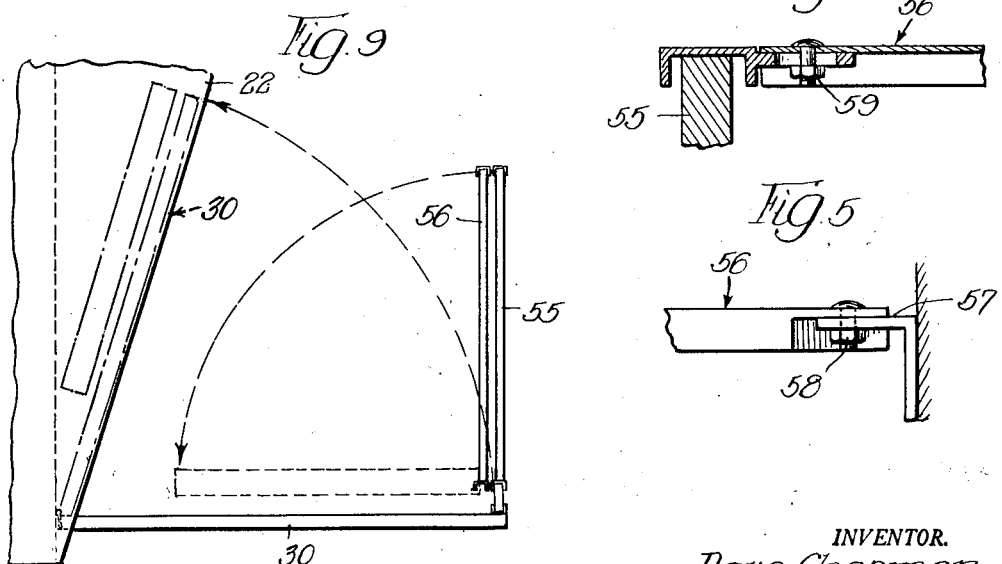
INVENTOR.
Dave Chapman,
BY
ATTYS

United States Patent Office 2,786,710
Patented Mar. 26, 1957

2,786,710

HOUSE TRAILER PORCH ASSEMBLY

Dave Chapman, Chicago, Ill., assignor to Prairie Schooner, Inc., Elkhart, Ind., a corporation of Indiana Application August 24, 1953, Serial No. 376,047

2 Claims. (Cl. 296—23)

This invention relates generally to house trailers and more particularly to a new and improved assembly for one end thereof whereby means are embodied to provide a fold away platform comprising a porch and the like.

Present day house trailers by and large are entered through a doorway in their side or rear walls, but normally the front end wall of the trailer is not used for such purposes. According to the concepts of my present invention, I intend that the forward end wall of the house trailer be constructed and arranged with a doorway or entrance and that a folding platform be supported in its lowered position by the normal undercarriage and towing framework for the house trailer thus to utilize known features of the house trailer for new and improved purposes. Briefly, the construction which encompasses my invention entails the projection of the side and top walls of the trailer beyond the normal front end wall thereof to provide an over-hanging or extending shelter and the provision of a porch platform hingedly connected to the framing of the house trailer body which may be swung upwardly for storage adjacent the forward end wall of the trailer and within the overhanging shelterway thereat.

The main object of my invention is to provide a new and improved construction for house trailer bodies and the like whereby means may be gained to provide a fold away porch or platform at the entry to the trailer.

A further object of my invention is to provide a new and improved collapsible assembly furnishing a platform supported by the underframing and particularly the towing end of the underframing of a house trailer for use as a porch, demonstrating improved features of compactness and utility.

The above and further objects, features and concepts of my invention will be recognized by those familiar with the art from the following detailed description and specification and with reference to the illustration of a preferred embodiment thereof as found in the accompanying drawings.

In the drawings:

Figure 1 is a front elevational view of the forward end of a house trailer body embodying the features and improved construction comprising my invention;

Figure 2 is an end elevational view of the assembly shown in Figure 1;

Figure 3 is a top plan view of the assembly shown in Figure 1 having portions broken away to demonstrate the features of the porch platform of my invention;

Figure 4 is an enlarged partial detail drawing in cross-section taken substantially along line 4—4 of Figure 3, to illustrate the mode of hinging the porch platform to the body of the trailer;

Figure 5 is an enlarged cross-sectional view, taken substantially at line 5—5 of Figure 3 to show the side rail fastening means employed;

Figure 6 is an enlarged cross-sectional view, similar to Figure 5, taken substantially along line 6—6 of Figure 3;

Figures 7 and 8 are each partial views in front elevation showing the construction and operational features of the step means employed with my platform or porch assembly;

Figure 9 is a partial end elevational view showing the mode of collapsing and storing the platform or porch as shown in Figures 1–3; and Figures 10 and 11 are similar enlarged partial views in front elevation with parts thereon broken away, to illustrate the operational sequence and features of one form of latch mechanism which may be employed to hold my porch platform in its stored condition.

Referring now to the drawings, it will be seen in Figures 1, 2 and 3 that an end wall 20 of the house trailer body is distinguished by a doorway 21 disposed substantially to one side of the longitudinal center line of such wall. Other locations for the doorway may be resorted to, but that illustrated herein is to be preferred. Further, it will be appreciated that side walls 22 and 23 of the trailer body project outwardly beyond end wall 21 in angular or oblique disposition and are joined or interconnected by an overhanging roof portion 24; the system of extending the roof and side walls of the trailer body beyond end wall 20 serving to provide a sheltered areaway or porch covering.

Mounted adjacent the lower edge of the end wall 20 is the improvement which constitutes the heart of my present invention comprising a retractable platform, indicated generally by numeral 30. Such platform is fabricated from suitable structural members, such as the two central, obliquely related A frame members 31, inner-connecting cross bar members 32, longitudinal girders or stringers 33 and a bounding rectangular frame work constituting end frame channel members 34 and front and back frame members 35 and 36, respectively. It will be understood that the several frame members which comprise the structure of my improved platform are suitably welded or otherwise rigidly joined together to make a rigidified unit. A deck comprising a plurality of wooden strips 37 is employed to cover over the framework for the platform; the same being joined thereto as by metal screws or the like and providing a planar surface for supporting the occupants of the trailer.

The platform structure comprising the porch or platform per se is joined in a hinged manner, as by leaf hinges 38 to the undercarriage framing of the trailer and particularly a cross beam member 39 thereof (see Figures 2 and 4). I prefer, as illustrated in Figure 3 to employ at least three such leaf hinges 38 for carrying the load of the porch platform.

Of great interest in the construction and employment of the platform is the internal A frame construction therein comprising members 31, 31 and 32 which is arranged, when the platform is in its lowered state as illustrated at Figures 1, 2 and 3, to fit or lie over the corresponding but smaller A frame 40 of the supporting carriage or underframing for the trailer body and consisting of draw bar member 41 and obliquely related frame members 42, 42 which merge to comprise a pulling tongue or hitch frame work for the trailer. In this regard it will be recognized that the draw bar A frame for a house trailer is not normally employed to support any such planar platform 30 as I herein conceive. Further, if desired, the draw bar A frame 40 of the trailer undercarriage optionally may be provided with a retractable wheel member indicated generally at 45 and comprising a known and recognized form of retractable wheel structure.

Additionally, short retractable supporting jacks 46, 46 may be hingedly secured as by pin members 47 to the forward corners of the platform of my porch structure; the same having means for extension and retraction thereby to assist in supporting the corners of the porch. In regard to such jack members, it is to be understood that the same are not essential to the practical utilization of the assembly of the present invention but are optional equipment.

In addition to the platform 30 hereinabove described, I prefer to provide a retractable step assembly 48 (see Figures 1, 7 and 8) comprising a planar tread board 49 mounted between a pair of angularly disposed support members 50, 50. The support members 50 are each pivotally connected at their upper ends with an end frame member 34 of the platform and further each is provided with an elongated slot 51 extending substantially along its length. The tread member 49 is also pivotally secured to the lower end of such support members and may be folded therebetween with the support members then being swung upwardly from their Figure 7 position for storage beneath the platform as shown in Figure 8. In this regard, it will be appreciated that other forms of retractable step assemblies may be employed and that the assembly illustrated is only for purposes of setting forth the concepts involved.

For convenience and safety, I also provide a set of railings comprising a front railing 55 and an end or side railing 56 which are suitably supported in an upright manner across one end and the front edge of the platform 30 when in use. As with the platform itself, such railings are designed and constructed for retraction or that is to say are to be knocked down. For example, hand railing 56 is joined by ear members 57 and pin or bolt means 58 to the end wall 20 of the trailer body (see Figure 5). The opposite end of this railing is hinged or pivotally adjoined by bolts 59 to the adjacent end of the front rail 55 as illustrated in Figure 6. Disconnection then of the railing 56 from the trailer body per se by removing bolts 58 permits the same to be swung in a counterclockwise direction for storage immediately adjacent and parallel to the front rail 55 (see the dotted line showing of Figure 3). The front rail in turn is pivotally pinned to supporting pad members 60 on platform 30 (see Figure 1) so that when the end rail 56 is swung inwardly, as indicated by the dotted lines in Figure 3, the front rail 55 may then be folded downwardly to nest immediately adjacent and against the upper face of the porch platform (see Figure 9).

In the normal operation of transporting a trailer provided with a fold-down porch as herein illustrated and described, it is contemplated and preferred that the same be stored adjacent the front wall 20 of the trailer. To this end the hinged connections of the platform 30 with the front end of the trailer body provides a convenient means for swinging the platform upwardly to a position in between the projecting side walls 22 and 23 of the trailer body. Means for maintaining the platform in its stored condition adjacent the front wall 20 may comprise any suitable latch mechanism of which numerous are presently known. For purposes of the present disclosure and description, I have illustrated in Figures 10 and 11 one form of device which may be employed to latch the platform in its stored position.

As to this latch, it will be recognized that the forward frame member 35 of the porch platform is provided with a pair of U-shaped channel sections 64 preferably welded to the underside of the frame member 35 in inverted relation. Registeringly aligned openings are bored or otherwise suitably formed through walls 65, 65 of each channel section 64 for receiving a retaining bolt 66. Such bolts are each provided with a pair of lock nuts 67, 67 one on either side of one of the walls 65 thereof. In the extended portion of side walls 22 and 23 of the trailer body recessed wells 68 are formed; the same being aligned so that when the platform 30 is swung to its raised position the latch bolts 66 can be inserted into such wells. During transportation of the trailer the two nut members 67 on each bolt are threaded toward one another to securely grip one of the walls 65 therebetween, as illustrated in Figure 11, thus serving to maintain the latch bolts in the wells. To lower the platform, unlatching of the mechanism illustrated in Figure 10, is accomplished by backing the nut members away from one another and withdrawing the latch bolt from its well.

From the above description and the accompanying illustration of one form in which the features of my invention may appear, it will be recognized that a new and improved construction for a house trailer body has been set forth whereby the A frame of the trailer's draw tree is employed as a supporting medium for a planar porch platform; this use of the draw bar being new in the art. It will further be appreciated that by virtue of the storing of the platform immediately adjacent the front wall 20 of the trailer body, the entry doorway 21 is provided with a safety barrier to prevent accidental exit through the doorway. Other advantages and features such as compactness, novel utilization and employment of the structural undercarriage and A frame drawtree of the trailer etc. will be recognized.

Therefore, while it is to be understood that numerous changes, modifications and substitutions of equivalents may be made in the preferred embodiment of my invention as illustrated in the drawings herewith, it is not my intention that I be limited to the specific features and details of construction illustrated and described except as may appear in the following appended claims.

I claim:

1. In a house trailer having a body supported on an undercarriage mounted on ground engaging wheels, the combination comprising, a front wall on said trailer body having an entrance doorway therethrough, portions of side and top walls of said body extending forwardly beyond said front wall to provide a sheltered areaway across the top and along the sides of said doorway, a planar platform member hinged about a horizontal axis along substantially the lower edge of said front wall and movable from a vertical stored position within said areaway across said front wall and doorway to a horizontal position extending forwardly of said front wall and areaway, and a draw tree framing of said trailer's undercarriage extending forwardly and beneath said front wall and interfitting with framing of said platform to support the latter in its horizontal position.

2. In a house trailer having an oblong body mounted on ground engaging wheels and provided with a front end wall and an A-frame hitch extending forwardly of such front end wall, the combination comprising, a door opening and door in the front end wall of the trailer, a platform member hinged substantially along the lower edge of the front wall and having a length substantially equal to the width of that wall, an under supporting frame for said platform including a central A-frame portion adapted to overfit the A-frame hitch of the trailer when said platform is swung about is hinge connection from a folded substantially vertical stored position barring said door opening to a horizontal operative position overlying the A-frame hitch, the same in its latter position providing a porch platform in front of said door.

References Cited in the file of this patent

UNITED STATES PATENTS

| | | |
|---|---|---|
| 935,744 | Cosgrove | Oct. 5, 1909 |
| 1,452,394 | Simon | Apr. 17, 1923 |
| 2,082,273 | Conkey | June 1, 1937 |
| 2,167,557 | Stout | July 25, 1939 |
| 2,193,352 | Thomas | Mar. 12, 1940 |
| 2,458,618 | McDonald | Jan. 11, 1949 |
| 2,484,312 | Rebours | Oct. 11, 1949 |